INVENTOR.
CHARLES R. QUESTA
BY
Thomas P. Murphy
ATTORNEY

Feb. 3, 1970 C. R. QUESTA 3,493,935

QUEUER CONTROL SYSTEM

Filed March 6, 1967 2 Sheets-Sheet 2

INVENTOR.
CHARLES R. QUESTA
BY
Thomas P. Murphy
ATTORNEY

United States Patent Office 3,493,935

Patented Feb. 3, 1970

3,493,935

QUEUER CONTROL SYSTEM

Charles R. Questa, King of Prussia, Pa., assignor to Burroughs Corporation, Detroit, Mich., a corporation of Michigan Filed Mar. 6, 1967, Ser. No. 620,848
Int. Cl. G11b *13/00;* G06f *1/00, 7/00*
U.S. Cl. 340—172.5 16 Claims

ABSTRACT OF THE DISCLOSURE

A queuing system for use in an accessing system providing data transfers between a main memory and a rotating disc file by selecting an access request word from a plurality of stored access request words when its address location on the rotating disc file is upcoming within a predetermined time to thereby initiate the data transfer. The plurality of access request words are stored in a memory stack. The total number of request words and the memory stack address of the last access request word entering the memory stack is stored. Each of the request words are systematically compared with the next upcoming disc address. When a request word compares true with the disc address, its position within the memory stack is noted and it is used to initiate the data transfer. After a true comparison the last access request word (the word at the top of the stack) is written into the position within the memory stack at the noted position. The memory of the total number of words and the last word to enter the queuer memory stack is appropriately updated.

This invention relates to control systems for sequential access type memories and more particularly to an apparatus for schematically loading, reviewing and replacing access request words in a stack memory from which are selected request words whose access times to the sequential type memory are within desired limits.

Sequential access type memories are those which can accept only one command or access request word at a time. Sequential access type memories commonly include rotating memories such as magnetic drums and discs. If access request words are presented to the rotating memory in the same order in which they are received from the main memory of a data processor or the like, i.e., without regard to the angular position of the rotating memory, the access time may be as long as it takes the rotating memory to make one complete revolution. In such a case, average access time is maximized resulting in a serious limitation on throughput times in a computer system where numerous data transfers must take place between the computer and the rotating memory.

For example, disc file systems wherein data is read or recorded on rotating discs receive access instructions in the form of access request words from a data processor via a control unit. Each access request word contains the address including the track and segment of a particular disc to or from which data is to be transferred. Each time an access request word is received by the control unit of the control unit of the disc file system, the control unit must wait until the disc is in the read or record position specified by the address information contained in the access request word. When this is done for each access request word coming from the data processor, average access time for a large number of access words is significantly increased.

A solution to the above problem may be had by utilizing a storage arrangement for receiving and storing a plurality of access request words. The addresses of the stored words are then systematically compared with the address of each upcoming memory location of one or more discs until there is a match of respective addresses. When a match is made, a control means grants access to the match producing access request word thereby initiating a data transfer at the disc memory location appropriate to the access request word whose address caused the match. By storing and comparing a plurality of access request words with each upcoming memory location of a disc, the average access time for each access request word to a disc memory may be significantly reduced. In such a system the reduction of average access time is limited in practice by the total number of stored access request words which may be compared with each disc memory location taking into account, of course, time consumed by the data transfer itself.

One implementation of such a system comprises the use of a device which stores in a memory stack disc transactions received from the computer in the form of access request words in a memory stack. A comparator provided with the address of each upcoming memory location of a rotating disc receives the access request words one at a time from the memory stack. When the address of an access request word is within a predetermined time bracket of the current disc address, a controller receives an input from the comparator. If it is not busy, the controller provides a data channel between the computer and the rotating disc and the data transfer commanded by the selected access request word is carried out. Each access request word in the memory stack is compared in its turn to the current disc address. The disc address provided the comparator is updated each time a true comparison is made or when all stored access request words have been compared with the current disc address without a match. Each time an access request word causes a data transfer its place in the memory stack is taken by the access request word which at that time happens to be at the top of the memory stack.

The structural arrangement by which the access request words are loaded into the memory stack, presented sequentially one by one to an output register for presentation to the comparator as well as the arrangement for replacing used access request words within the memory stack by the access request word at the top of the stack form the subject matter of the present invention.

The present invention concerns itself with an arrangement for systematically processing a plurality of stored access request words for individual presentation to an output register. In carrying out the present invention, access request words received from a central computer are entered into a stack memory. The address of the access request word at the top of the stack is retained in an associated register. The stored access request words are systematicaly reviewed by writing each one in turn into the output register. If the access request word in the output register is utilized, as for example, by matching the addresss of the next upcoming address location on a rotating disc to thereby initiate a data transfer, its position with the memory stack is filled by the access request word at the top of the memory stack. In any event, the systematic review of the stored access request words continues, stopping only for the time one is in use.

Therefore, it is an object of the present invention to provide an apparatus for the systematic processing of a plurality of stored access request words received from a computer for substantially decreasing the average access time to a disc file memory.

It is another object of the present invention to provide a system for loading and systematically reviewing access request words stored in a stack memory.

A further object of the present invention is to provide a system for loading, systematically reviewing and replacing selected access request words stored in a stack memory.

Other objects and many of the attendant advantages of the present invention will become more apparent with a reading of the following description in conjunction with the drawing wherein.

Figure 1:
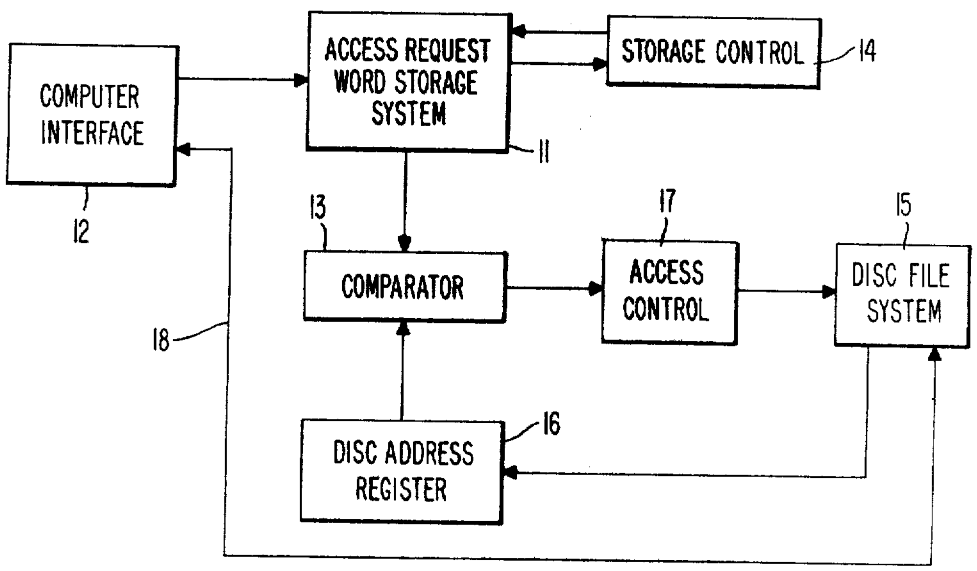
FIGURE 1 illustrates in block diagram form a disc file accessing system of a type in which the present invention is used.

Referring now more particularly to FIGURE 1 there is shown an access request word storage system 11 capable of storing up to a predetermined maximum number of access request words received from a computer (not shown) via a computer interface 12. The access request word storage system is connected to a comparator 13. A storage control 14 connected to the access request word storage system 11 operates to present each of the words stored in the storage system 11 to the comparator 13 one at a time. The manner in which the storage control 14 functions as well as its functional relationship with the storage system 11 is explained more fully hereinbelow.

The disc file system 15 containing one or more rotating memory discs to and from which data is to be transferred is connected to a disc address register 16. The disc file system 15 inserts into the disc address register 16 the address of the next upcoming memory location of a selected disc within the disc file system 15. For purposes of explaining this invention the disc file system 15 may be thought of as containing a single rotating memory disc.

The disc address register 16 is connected to the comparator 13 and presents thereto the address of the next upcoming memory location of the rotating magnetic disc. The number of memory location addresses inserted into the disc address register 16 during one complete revolution of the rotating memory disc is equal to the total number of memory locations contained on a disc. Each memory location has a distinct address which, when the disc reaches a predetermined point in its revolution, is caused to be inserted into the disc address register 16.

Each of the access request words stored in the storage system 11 contains an address in suitably coded form of one of the memory locations of the disc. The timing of the system is such that all the access request words are sequentially presented to the comparator 13 during the time that the disc address register 16 contains the current memory location address. In other words, each of the access request words stored in the storage system 11 is compared to a single memory location address. When the memory location address is changed in the disc address register, each of the access request words are compared one by one to that address, etc.

When the address of the one of the access request words so compared matches or compares true with the address in the disc address register, an access control 17 is activated to cause a data channel indicated by reference numeral 18 to be connected between the memory location on the disc whose address has been matched by the address contained in the access request word and the computer via the computer interface 12. The access request word which caused the true comparison also contains in appropriate code the particular type of transfer to be made. For example, data from the main memory of the computer may be transferred for writing onto the disc or data read from the disc may be transferred to the main memory of the computer. The access request word designates the read or write operation and, therefore, the type of transfer.

Once the data transfer is complete, the access request word which initiated the transfer is disposed of. The address in the address register 16 is updated and the cyclic comparison continues. In practice the disc file 15 would include a plurality of discs arranged in modules or groups of a predetermined number with each group under control of an electronic unit. In such a system there might be several comparison phases during which the module, the disc within a module, the segment within a disc and a track within a segment is selected. Such a system is completely disclosed in a patent application filed Nov. 26, 1965 for "File Control System" by James R. Bennett et al., Ser. No. 509,925 and having the same assignee as the present application.

In a practical embodiment of the present invention each of a plurality of electronic units control a plurality of disc storage units. In such a system the access request words stored in the memory stack would include binary information to permit selection of the electronic unit and particular disc storage unit. After selection of the proper disc storage unit the comparison between segment and addresses would take place. If the comparison was not true, the next access request word might cause the same or another electronics unit and disc storage unit to be selected depending on the electronics unit and the disc storage unit information contained in the access request word. The address in the disc address register would, of course, change each time a different disc was selected. Of course, as the number of discs increases, it may not be possible to review all access request words with each upcoming disc address.

Figure 2:
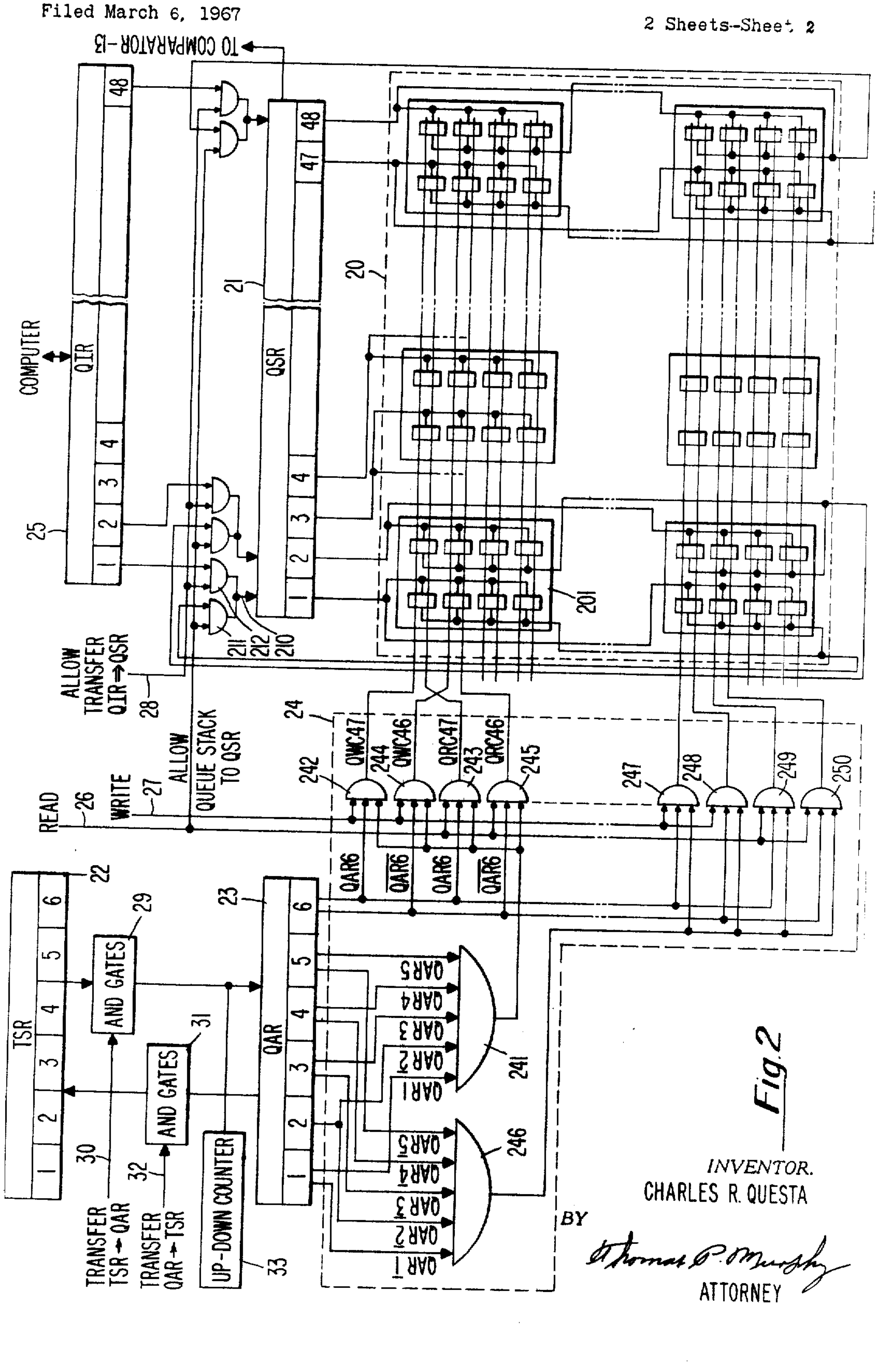
FIGURE 2 illustrates in block diagram form a preferred embodiment of the present invention.

FIGURE 2 illustrates in block diagram form a detailed description of the access request word storage system 11 and the storage control 14. The access request word storage system and control comprises six basic elements including a queuer memory stack 20, a queuer stack register 21, a top of the stack register 22, a queuer address register 23, a decoder 24 and a queuer input register 25. While the storage capacity of the queuer memory stack 20 and the length of words stored therein may be more or less, for purposes of explanation, a 48 word 48 bit capacity has been chosen.

During loading of the queuer memory stack 20 each access request word coming from the main memory of the computer or some other source, is transferred and temporarily stored in the queuer input register 25 hereinafter called the QIR 25. The word in the QIR 25 is then parallelly transferred to a queuer stack register 21 hereinafter called the QSR 21. By appropriate control means the word is then written into a word storage location within the queuer memory stack in a manner more fully described hereinbelow. The words are "stacked" in the memory stack 20 in the order received, i.e., the first word goes into word or memory location 1, the next into memory location 2, etc. with the last word in normally assuming a memory location at the top of the memory stack 20.

During read out each of the words in the memory stack are transferred one by one ot the QSR 21 for possible utilization such as initiation of a transfer if a true comparison or match occurs. Of course, some other criteria for utilization might be followed other than that used in the disc accessing system described in FIGURE 1.

The address within the queuer memory stack 20 of the last word therein written is registered in a top of the stack register 22 hereinafter called the TSR 22. To accomplish this the queuer address register 23 hereinafter called the QAR 23, is utilized in conjunction with the TSR 22. The size of the TSR 22 and the QAR 23 need only be six bits since in this presentation the storage capacity of the queuer memory stack 20 is 48 words.

During loading of the queuer memory stack 20, that is, when a word in the QSR 21 is to be transferred to the queuer memory stack 20, the contents of the TSR 22 are transferred to the QAR 23 and simultaneously the contents of the QAR 23 are transferred to the TSR 22. The number or address stored in the QAR 23 selects with the aid of the decoder 24 the storage location at which the word in the QSR 21 is to be written. After the contents of the TSR 22 and the QAR 23 are exchanged, the address or number within the QAR is incremented by one. The new address within the QAR 23 selects the next memory location within the queuer memory stack 20 into which a word is to be written. The word contained in the QSR 21 is then transferred or written into the stack at the memory location defined by the number within the QAR 23. The contents of the QAR 23 and the TSR 22 are then exchanged again terminating the write operation. The TRS 22 then contains the address within the queuer memory stack 20 of the word just written. For each word loaded or written into the queuer memory stack 20 this process is repeated. Thus, the TSR 22 continuously has registered therein the address of the word that the top of the stack in the queuer memory stack.

When no leading of the queuer memory stack 20 is occurring, the queuing operation is begun. During this operation each of the words stored within the queuer memory stack 20 are read out sequentially starting with the word at the top of the stack whose queuer memory stack address is contained in the TSR 22. The words are read out one by one into the QSR 21 until all the stored words have been read out. Then the disc address is updated and the cycle is repeated. This read out may be stopped when a word is selected for utilization. This cycle may also be stopped when another word or words are being loaded into the queuer memory stack 20.

For the queuing operation the contents of the TSR 22 are transferred to the QAR 23. By means of the decoder 24 the word whose memory location in the memory stack 20 corresponds to the address contained in the QAR 23 is transferred or read out into the QSR 21. Each time a word is transferred to the QSR 21, the address in the QAR 23 is decremented by one thereby making ready for the next transfer. After the address in the QAR 23 is decremented by one, the next word in the stack is transferred to the QSR 21. If this word is not selected for utilization, the address within the QAR 23 is again decremented by one and the word at that memory location within the queuer memory stack 20 is read into the QSR 21. This process continues until something happens causing it to stop, for example, when the word most recently transferred to the QSR 21 is selected for utilization or when the queuer memory stack 20 is being located. It should be noted that the read out or transfer of words from the queuer memory stack 20 to the QSR 21 is non-destructive, i.e., the word is still retained in the queuer memory stack 20. Only when words are written into the queuer memory stack 20 is the word in the selected memory location destroyed and supplanted by the written word. Each of the registers used in this invention also have this non-destructive property during read out.

Further, once a word in the queuer stack memory 20 is utilized, the stack of words in the queuer memory stack 20 is compressed. This is accomplished by taking the word at the top of the stack whose address is retained in the TSR 22 and inserting it into the location of the used word whose address has been retained by the QAR 23. During this operation the contents of the TSR 22 and QAR 23 are exchanged. The address of the word at the top of the stack is then in the QAR 23. Then the word whose address is in the QAR 23 is read into the QSR 21. The QAR 23 is then decremented by one. The contents of the QAR 23 and the TSR 22 are again exchanged. It will be noted that the address now in the TSR 22 is the address of the word that was at the top of the stack minus one. The word in the QSR 21 is then written into the location occupied by the utilized word. This is so because the address in the QAR 23 being the address of the used word causes the word in the QSR 21 to be written into that address location in the memory stack 20. Now the address in the TSR 22 is the address of the new word at the top of the stack in the queuer memory stack 20. The queuing operation is then commenced again at that point in the stack. If the queuer memory stack 20 before compression was completely filled, it will be obvious that there is now room for one more word to be loaded therein. If no words are available for loading, it will be seen that there is a lesser number of words to review. The details of the components, their functions and functional relationship with respect to one another are described in somewhat more detail hereinbelow.

The queuer memory stack 20 is basically as simple apparatus and essentially comprises a plurality of rows and columns of flip-flops. There is a column of flip-flops for each bit in a word to be stored and a row of flip-flops for each word to be stored. For the storage capacity chosen for purposes of presentation, i.e., 48 words each comprising 48 bits, each row and column contains 48 flip-flops. Each of the flip-flops in the first column are connected to the output terminal of the first bit position of the QSR 21. Each of the flip-flops in the second column are connected to the output terminal of the second bit position of the QSR 21 and so on with the remaining columns. Each of the flip-flops in the first row are connected to a write control terminal and a read control terminal. For example, all of the flip-flops in the first row are connected to write control terminal QWC 47 and read control terminal QRC 47. The first row of flip-flops is arbitrarily chosen as the memory location in queuer memory stack 20 for the 48th stored word and has a binary address of 47. The flip-flops in the second row store the 47th word. The second row has a binary address of 46 with each of the flip-flops therein being connected to read control terminal QWC 46 and write control terminal QRC 46. The bottom row in the queuer memory stack 20 has all of its flip-flops connected to the write control terminal QWC 00 and the read control terminal QRC 00. The forty-eight rows are numbered zero through 47 for a total of 48 memory locations within the queuer memory stack 20. Although not shown, it should be understood that the flip-flops in the memory locations 45 through 1 are connected to the appropriate read and write control terminals and each of the columns of flip-flops are connected to the appropriate output terminal of the QSR 21.

Each of the forty-eight bit positions of the QSR 21 has an input terminal (only three of which are shown), through which words from the QIR 25 or from a selected one of the 48 memory locations within the queuer memory stack 20 are transferred to take QSR 21. Since all of the input terminals in the QSR 21 are similar, only that input terminal 210 connected to the first bit position of the QSR 21 is discussed, it being understood that the rest are similar in structure and function.

The input terminal 210 includes first and second AND gates 211 and 212. The AND gate 211 receives one input over the read input terminal 26 whenever a read operation is to be performed. The other input terminal to the AND gate 211 is connected to each of the flip-flops in the first column of queuer memory stack 20. Thus, when a read operation is to take place, and a read pulse appears on the terminal 26, the word in the memory location within queuer memory stack 20 whose address is currently in the QAR 23, is transferred into QSR 21. The bit from the first column of flip-flops passes through the AND gate 211 of the input terminal 210. The AND gate and input terminal counterparts to the AND gate 211 and the input terminal 210 for the rest of the bit position of the QSR 21 also pass a bit from the appropriate column and row of the flip-flops within the queuer memory stack 20 to the corresponding bit position within the QSR 21. Similarly, a write pulse on the terminal 27 causes a word in the QSR 21 to be written into the memory location within the queuer memory stack 20 whose address is in the QAR 23.

In FIGURE 2 a queuer memory stack 20 is shown as comprising a plurality of memory cells 201 each containing eight flip-flops. There are twenty-four of these memory cells in a row and twelve in a column. These memory cells 201 are conventional. However, since each flip-flop in the memory cells in practice requires additional logic circuitry, to effect reading and writing, a typical flip-flop and its associated logic circuitry is shown in FIGURE 3 and is briefly described hereinbelow.

Figure 3:
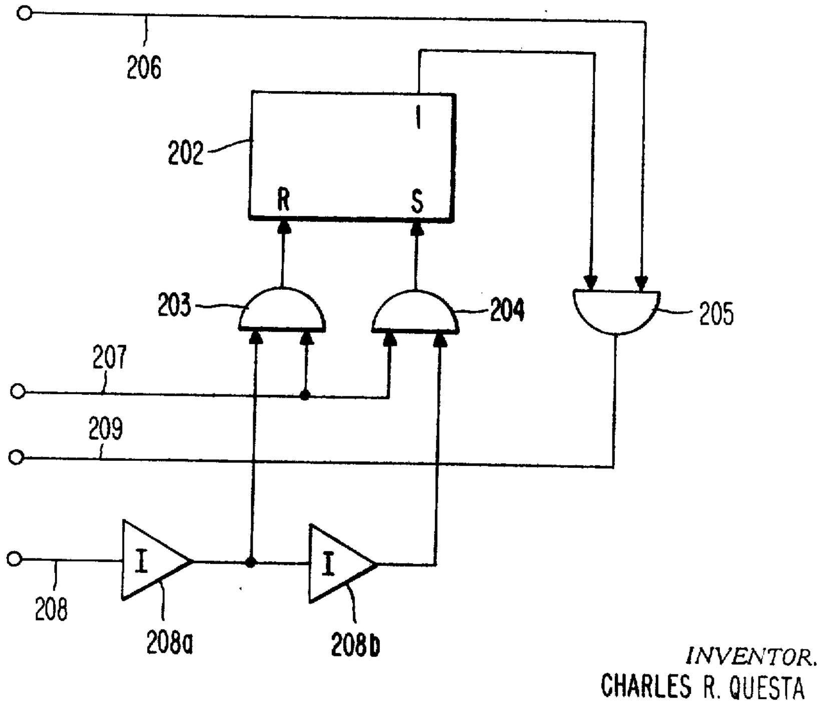
FIGURE 3 illustrates a single memory unit of a memory cell of a type used in the stack memory of FIGURE 2.

FIGURE 3 shows a flip-flop 202 and AND gates 204 and 205. The AND gate 204 is connected to the set input terminal of the flip-flop 202 while the AND gate 203 is connected to the reset input terminal of the flip-flop 202. The set output terminal of the flip-flop 202 serves as one input to the AND gate 205 while conductor 206 serves as the second input terminal to the AND gate 205. The conductor 206 carries the read control pulse. The conductor 207 serves as one input terminal to the AND gates 203 and 204. The conductor 207 serves as the write control terminal. A conductor 208 serves as the second input terminal to the AND gates 203 and 204. The conductor 208 carries a bit from one of the bit positions, for example, bit position one of the QSR 21. A pair of inverters 208a and 208b are included in the conductor 208 in the positions shown. Thus when a "1" is present in bit position one of the QSR 21 it is provided as a "1" to the AND gate 204 and a "0" to the AND gate 203. Inversely, when the bit in bit position one of the QSR 21 is a "0," it is provided as a "1" to the AND gate 203 and a "0" to the AND gate 204.

Taking a case where the bit provided to the QSR 21 on the conductor 208 is a binary "1," it will be seen that a write pulse on the conductor 207 sets the flip-flop 202 and a "1" is written therein. When the flip-flop 202 is set, there is provided an output pulse to the AND gate 205. To read out, a read pulse is provided on the conductor 206 supplying a second input to the AND gate 205 which provides a pulse on the output conductor 209 indicative of a "1." It will be noted that this read out is of the nondestructive type. Reading and writing of a binary "0" is accomplished in the same manner.

The QIR 25 is effectively an interface between the main computer and the present queuing system. During loading of words into the QSR 21 and thence into the queuer memory stack 20 each word from the computer is momentarily registered in the QIR 25. An output terminal connected to the first bit position of the QIR 25 serves as one input to the AND gate 212. A conductor 28 provides the second input to the AND gate 212 when the bit in bit position one of the QIR 25 is to be transferred to bit position one in the QSR 21. The other 47 bits of the word in the QIR 25 are also transferred to the QSR 21 during the existence of the pulse on the conductor 28 via the counterparts to the AND gate 212 connected between the respective bit positions of the QIR 25 and the QSR 21.

As previously explained, the contents of the TSR 22 and the QAR 23 are exchanged when each word is loaded from the QIR 25 to the QSR 21. The structure for performing this function is quite conventional but it is nevertheless briefly explained hereinbelow.

The TSR 22 and the QAR 23 are 6 bit registers. Each bit position output terminal of the TSR 22 is connected to its respective bit position input terminal of the QAR 23 via an individual AND gate. The block 29 represents the necessary six AND gates. When a transfer from the TSR 22 to the QAR 23 is required, each AND gate in the block 29 is provided with a transfer gate pulse over a conductor 30.

In a similar fashion, each bit position output terminal of the QAR 23 is connected to its respective bit position input terminal of the TSR 22 via an individual AND gate. The block 31 represents the necessary six AND gates. When a transfer from the QAR 23 to the TSR 22 is required, each AND gate in the block 31 is provided with a transfer gate pulse over a conductor 32.

When a simultaneous exchange of words between the TSR 22 and the QAR 23 is required, the conductors 30 and 32 are provided with simultaneous transfer pulses. Transfers and exchanges between the TSR 22 and the QAR 23 all occur with a clock pulse provided by conventional system timing (not shown).

Any conventional means, e.g., an up-down binary counter 33, may be utilized to provide the necessary increment or decrement of the addresses in the QAR 23.

The decoder 24 functions to convert each of the possible 48 address words in the QAR 23 to a pulse on the read or write control conductors of the particular memory location (row of flip-flops) within the queuer memory stack 20.

The decoder 24 utilizes conventional logic circuitry for selecting a memory location within the queuer memory stack 20 in accordance with the address location registered in the QAR 23. For example, to read or write at memory location 47, AND gates 241, 242 and 243 are provided. The AND gate 241 is so connected to the individual bi-stable elements within the QAR that for a binary address equivalent to the decimal numbers 46 or 47, it has an output. The output terminal of the AND gate 241 serves as one input terminal to each of the AND gates 242 and 243. A second input terminal to each of the AND gates 242 and 243 is provided by the set output terminal located at bit position 6 in the QAR 23. The wire terminal 27 serves as the third input terminal to the AND gate 242 while the read terminal 26 services as the third input terminal to the AND gate 243.

When the QAR 23 has registered therein the binary number 101111 (decimal number 47), the AND gates 242 and 243 each have a high on their respective first and second input terminals. When a write pulse occurs on the terminal 27, the AND gate 242 is gated and provides a pulse on write control terminal QWC 47. As explained above, this causes the word in the QSR 21 to be transferred to memory location 47 in the queuer memory stack 20.

If it were the read terminal 26 that was pulsed, the word at memory location 47 would be transferred to the QSR 21. In order to write into and read from memory location 46 of the queuer memory stack 20, AND gates 244 and 245 are provided. The second input to the AND gates 244 and 245, however, would be provided by the reset output terminal from bit position 1 of the QAR 23. Thus, for the binary number 10110 (decimal number 46) a word is transferred to memory location 46 from the QSR 21 or to the QSR 21 from the memory location 46 when terminal 27 or terminal 26 is pulsed.

The decoder 24 provides similar logic circuitry to select memory location 45 through 0 in accordance with the address in the QAR 23. For example, the circuitry for selecting memory locations 0 and 1 is shown. It comprises an AND gate 246 having inputs provided by the reset output terminals from the first five bit positions of the QAR 23. Thus, the AND gate has a high only when the bit in each one of these positions is a "0," i.e., for the binary numbers 000 000 or 000 001 (decimal numbers 0 or 1). The AND gate 246 provides one of the input terminals to each of AND gates 247, 248, 249 and 250. The terminal 26 provides a second input to the AND gates 249 and 250, while the terminal 27 provides a second input to the AND gates 247 and 248. The set output terminal from bit position 1 of the QAR 23 serves as the third input to the AND gates 247 and 249 while the reset output terminal serves as the third input to the AND gates 248 and 250. Thus, words are transferred to and from the memory locations 1 and 0 for the binary numbers 000 000 and 000 001 when a pulse appears on the terminals 26 and 27.

The memory locations 45 through 2 of the queuer memory stack 20 are served with similar selecting logic circuitry.

The timing of the inputs to the present queuing system is quite simple and is easily implemented by conventional means. The machine has three states—the loading state QS, the queuing state QU and the compressing state QC. Phase pulses P are provided by a first clock generator. Sync pulses S are provided by a second clock generator. Four sync pulses occur during each phase pulse. When the machine is in one of its states QS, QU or QC, certain sequences are carried out during selected sync pulses. For example, when the machine is in the loading or QS state, and the first phase pulse P is produced, the pulse P1 causes the sync pulses S1, S2, S3 and S0 to be generated. When sync pulse S1 occurs with pulse phase P1, the exchange of contents between the TSR 22 and the QAR 23 is caused by, e.g., applying pulses to the conductors 30 and 32. On the next sync pulse S2 the QAR is incremented by one by a pulse applied to up and down counter 33. On the next sync pulse S3 a write pulse is applied to write terminal 28, causing the word in the QSR 21 to be written into the memory stack at the memory location identified by the address in the QAR 23. On the next sync pulse S0 the contents of the QAR 23 and the TSR 22 are exchanged again.

When the next phase pulse P2 occurs, the cycle may be repeated until the memory stack 20 is full at which time the machine automatically enters the queuing or QU state. Also, the machine may be programmed to enter the QU state before the memory stack 20 is full as for example, when there is no word available in the QIR 25, the machine would be returned temporarily to the QS state to load that word into the memory stack 20.

When the machine enters the QU state, the contents of the TSR 22 are automatically transferred to the QAR 23. During this state phase and sync pulses occur. When the phase pulse P1 and the sync pulse S1 occur, a pulse is applied to read terminal 26 causing the word in the memory location of the memory stack 20 as determined by the address in the QAR 23 to be transferred to the QSR 21. If that word is not used, e.g., to select a memory location in the disc file, nothing occurs during the rest of the P1 pulse. However, when the phase pulse P2 and the sync pulse S1 occur, the QAR 23 is decremented by one by a pulse to the counter 33. This process of read and decrement continues until the address in the QAR 23 equals zero at which time the cycle is repeated by transferring the contents of the TSR 22 to the QAR 23 again. Each word in the memory stack is sequentiallly read into the QSR 21.

If, however, during the P1 pulse of the QU state a word in the QSR 21 is utilized as e.g., to select a memory location in the disc file system, the machine is automatically put into the compressing or QC state.

During phase pulse P1 of this state the following sequence occurs. On the sync pulse S1 the contents of the TSR 22 and the QAR 23 are exchanged. On the sync pulse S2, the word in the memory stack 20 at the memory location determined by the address in the QAR 23 is read into the QSR 21. On the sync pulse S3 the QAR 23 is decremented by one.

During phase pulse P2 of the QC state the contents of the TSR 22 and the QAR 23 are exchanged on sync pulse S1. On sync pulse S2 the word in the QSR 21 is transferred to the memory location within the memory stack 20 as determined by the address in the QAR 23. On the sync pulse S3 the machine may be returned to the QS state for further loading of the memory stack or returned to the QU state for continuation of the queuing.

An implementation of the foregoing described timing may be simply set forth. The sync pulse generator may have four output terminals with the pulses S1, S2, S3 and S0 sequentially appearing on the output terminals, respectively. In like manner the phase pulse generator would have two output terminals, one for P1 pulses and the other for P2 pulses. When the machine is in a state QS, QU or QC, a high is provided at an appropriate terminal. By use of simple ANDing, each function may be caused to occur. For example, an AND gate connected to the QS terminal would also be connected to the P1 output terminal of the phase pulse generator and the S1 terminal of the sync pulse generator. Thus, when the QS terminal is high, the AND gate has an output, when the phase pulse P1 and sync pulse S1 occured. For this condition the start of loading words into the memory stack 20 commences by the exchange of the contents of the TSR 22 and the QAR 23 by applying the pulse from the AND gate to each of the conductors 30 and 32. For each function a different AND gate is used. When a word in the QSR 21 is used, the utilization device provides a pulse to automatically set the machine to the QC state.

What is claimed is:

1. A queuing system, comprising in combination:
a memory stack having a plurality of memory locations,
first register means connected to said memory stack,
address register means,
decoder means connected between said address register means and said memory stack for selecting a memory location within said memory stack in accordance with the address in said address register,
first means for applying a read pulse to said selected memory location for transferring a word from said memory location to said first register means,
second means for applying a write pulse to said selected memory location for transferring a word from said first register means to said memory location,
second register means connected to said address register,
third means for transferring the contents of said second register means to said address register means,
fourth means for transferring the contents of said address register means to said second register means,
fifth means for selectively increasing or decreasing the number in said address register means one digit at a time.

2. A queuing system comprising in combination:
a memory stack for storing words at a plurality of memory locations,
first register means connected to said memory stack,
address register means,
decoder means connected between said address register means and said memory stack for selecting a memory location within said memory stack in accordance with the address stored in said register means,
second register means connected to said address register means for storing the address of the word currently at the top of said memory stack,
control means for transferring the words between said memory stack and said first register means.

3. A queuing system according to claim 2 wherein said control means comprises:
first means for transferring the address in said second register means to said address register means,
second means sequentially applying transfer pulses to the memory location selected by said decoder means for transferring the word at that memory location to said first register means,
third means decrementing the address in said address register means after each of said transfer pulses.

4. A queuing system according to claim 2 wherein said control means comprises:
means for transferring the word at the top of said memory stack to the memory location currently selected by said decoder means.

5. A queuing system according to claim 2 wherein said control means comprises:
first means sequentially applying transfer pulses to the memory location selected by said decoder means for transferring a word in said first register means to said selected memory location,
second means incrementing the address in said address register means before each of said transfer pulses,
third means for exchanging the contents of said address register means and said second register means before and after each word transfer to said first register means.

6. A queuing system according to claim 5 wherein said control means comprises:
means for trasnferring the word at the top of said memory stack to the memory location currently selected by said decoder means.

7. A queuing system according to claim 3 wherein said control means further comprises:
fourth means for sequentially applying transfer pulses to the memory location selected by said decoder means for transferring a word in said first register means to said selected memory location,
said third means incrementing the address in said address register means before each of said transfer pulses,
fifth means including said first means for exchanging the contents of said address register means and said second register means before and after each word transfer to said first register means.

8. A queuing system according to claim 6 wherein said control means further comprises:
means for transferring the word at the top of said memory stack to the memory location currently selected by said decoder means.

9. A queuing system comprising in combination:
a memory stack having a plurality of memory locations,
first register means,
second register means connected to said memory stack and said first register means,
first means exchanging the contents of said first and second register means,
second means for incrementing the number in said second register means by one,
third means writing a word into said memory stack at the memory location therein designated by the number in said second register means each time the number in said second register is incremented,
said first means exchanging the contents of said first and second register means after each word is loaded into said memory stack whereby said first means maintains in storage the address of the word currently at the top of said memory stack.

10. A queuing system, comprising in combination:
a memory stack having a plurality of memory locations,
first register means connected to said memory stack,
second register means storing the address of the word at the top of said memory stack,
address register means connected to said memory stack and said second register means,
first means transferring the contents of said second register to said address register,
second means decrementing the number within said address register each time a word is transferred from said memory stack to said first register,
third means transferring to said first register the word in said memory stack occupying the memory location designated by the address contained in said address register each time the contents of said second register are transferred to said address register.

11. A queuing system, comprising in combination:
a memory stack having a plurality of memory locations,
first register means,
second register means,
first means exchanging the contents of said first and second register and incrementing the number in said second register by one prior to the loading of a word into said memory stack,
second means loading a word into said memory stack at the memory location designated by the number in said second register,
said first means exchanging the contents of said first and second register means after a word is loaded into said memory stack whereby said first register maintains in storage the address of the word at the top of said memory stack.

12. A queuing system, comprising in combination:
a memory stack for storing words at a plurality of memory locations,
register means,
first means connected to said memory stack reading said words sequentially from said memory locations into said register means,
second means connected to said memory stack for writing the word at the top of the stack in said memory stack into a selected one of said memory locations.

13. An apparatus for use in a disc file system for accessing a sequential access storage medium to provide data transfers to and from the storage medium, comprising in combination:
a memory stack for storing access request words at sequentially increasing address positions,
register means,
first means connected to said memory stack transferring said words sequentially one at a time to said register means,
second means connected to said first means utilizing selected ones of said transferred words for initiating a data transfer function,
means filling the position occupied within said queuer memory stack by the used access request word with the word having the highest address number within said queuer memory stack.

14. A queuing system, comprising in combination:
a memory stack for storing words at a plurality of memory locations,
register means connected to said memory stack,
address register means,
decoder means connected between said address register means and said memory stack for selecting a memory location within said memory stack in accordance with the address stored in said address register means,
means for incrementing by one the address in said address register each time a word in said register means is loaded into said memory stack whereby each word is loaded into the next higher memory location within said memory stack.

15. A queuing system, comprising in combination:
a memory stack having a plurality of memory locations,
means loading words into said memory locations sequentially from the bottom to the top of said memory stack,
first register means connected to said memory stack,
second register means maintaining in storage the address of the word currently at the top of said memory stack,
means sequentially transferring the words in said memory stack to said register means beginning with the word at the top of the memory stack,
means for transferring the word at the top of said memory stack to a selected memory location within said memory stack.

16. A queuing system, comprising in combination:
a memory stack for storing words at a plurality of memory locations,
register means connected to said memory stack,
address register means,
decoder means connected between said address register means and said memory stack for selecting a memory location within said memory stack in accordance with the address stored in said address register means,
means for incrementing by one the address in said address register each time a word in said register means is loaded into said memory stack and decrementing by one each time a word in said memory stack is transferred to said register means.

References Cited

UNITED STATES PATENTS 3,234,524 2/1966 Roth ............ 340—172.5
3,350,694 10/1967 Kusnick et al. ...... 340—172.5

RAULFE B. ZACHE, Primary Examiner